Feb. 26, 1957  R. B. PETTIBONE  2,782,718
SPEED-COMPENSATED FLOW CONTROL
Filed May 4, 1955
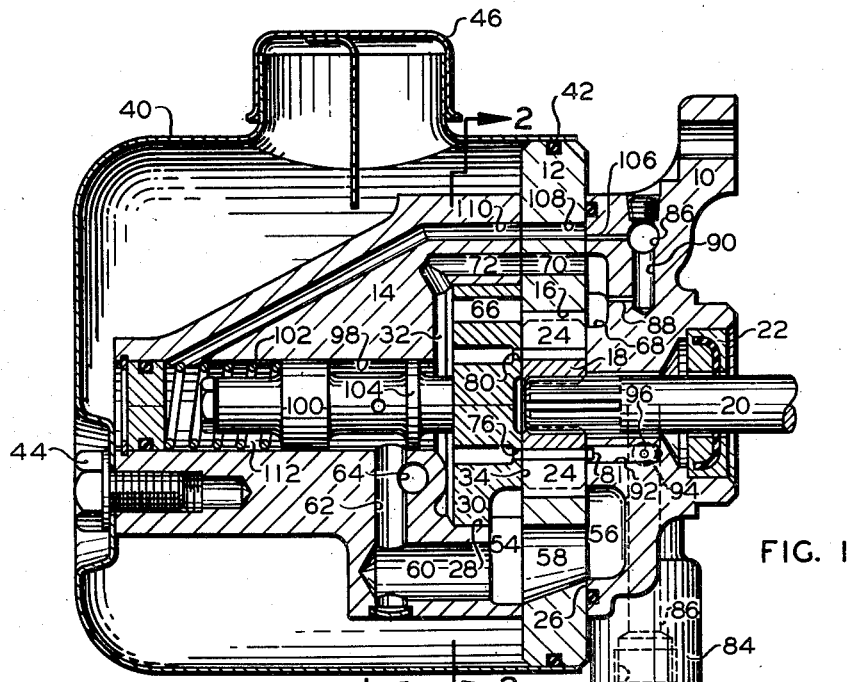
FIG. 1
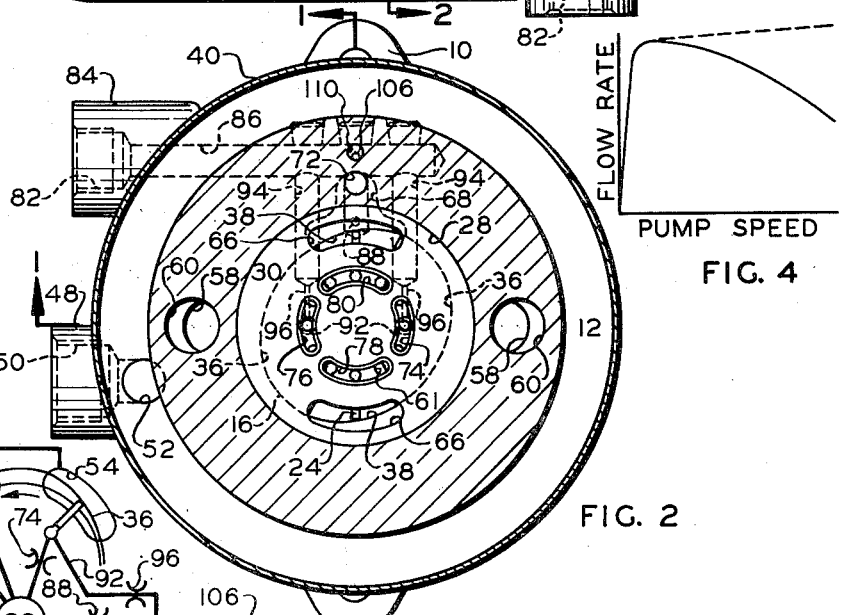
FIG. 3
FIG. 2
FIG. 4
*INVENTOR.*
RAYMOND B. PETTIBONE
BY
*ATTORNEY*

United States Patent Office 2,782,718
Patented Feb. 26, 1957

2,782,718

SPEED-COMPENSATED FLOW CONTROL

Raymond B. Pettibone, Detroit, Mich., assignor to Vickers Incorporated, Detroit, Mich., a corporation of Michigan Application May 4, 1955, Serial No. 505,958

8 Claims. (Cl. 103—42)

This invention relates to power transmissions, and is particularly applicable to those of the type comprising two or more fluid pressure energy translating devices, one of which may function as a pump and another as a fluid motor.

More particularly the invention relates to a flow control system for such a transmission in which the pump is driven by a variable speed prime mover, such as the engine of a motor vehicle.

In such transmissions the fluid actuated accessories often require as high a rate of fluid supply during engine idle periods as during high speed engine operation. For example, this is true in the case of a steering booster. Thus, where a constant displacement pump directly driven from the vehicle engine is utilized, the pump discharge flow rate at engine idle must be sufficiently high for satisfactory accessory operation. As engine speed increases, so also does the discharge rate of the pumping mechanism. In the usual motor vehicle the ratio of engine idle speed to top speed is approximately one to ten. Thus, there is an over-supply of fluid at all times when engine speeds are substantially above idle. Where precise control is required, as in steering, this variable over-supply presents a serious problem.

The prior art has attacked the problem of fluid over-supply to the load by providing spill-over, or by-pass, type flow controls in the system. The usual arrangement has a by-pass valve at the pump outlet which is spring biased to a closed position in which all fluid pumped goes to the load. A restriction to fluid flow in the motor line creates a pressure differential which is proportional to the flow rate to the work and this differential is utilized to control the by-pass valve. When flow to the work reaches a certain desired magnitude, the pressure differential overcomes the valve spring and causes the by-pass valve to shift and thus divert pumped fluid away from the work and back to the reservoir. When the cracking point of the by-pass valve has been reached, further increases in pumping rate result in greater opening of the valve and increased flow of by-pass fluid. Such a spill-over type valve is shown in Figure 1 of the patent to Amsler, No. 1,467,522.

The above described arrangement has been quite satisfactory but has one important disadvantage. This disadvantage results largely from the rate characteristics of the biasing springs used in the by-pass valve and the velocity effect of the by-passed fluid on the valve spool. Due to the spring rate and velocity effect, an increasing pressure differential is required to move the by-pass valve from the cracking position to the wide open position. Since the valve actuating pressure differential is proportional to flow rate to the work, flow rate to the work must increase as the valve moves from cracking to wide open. The consequent increase in flow rate to the work resulting from variations in pump speed above the valve cracking point is of substantial magnitude and has been found detrimental to precise control in such applications as steering systems.

Further, extremely high pump speeds are normally associated with high vehicle speeds. Since at high vehicle speeds the rate of maneuvering is of necessity limited, a high rate of supply to the steering booster is not required. If the high, or increasing, supply rate is continued, it results in waste of power and excessive heating of the oil. Thus, power can be conserved and operating temperatures reduced by slightly lowering the flow rate to the booster during high speed vehicle operation.

It is an object of this invention to provide an improved, low cost fluid flow control system for delivering a substantially constant fluid flow rate to a load from a variable flow rate source, throughout a wide range of operating speeds.

It is a further object to provide such a system in which the flow rate is more accurately controllable than in prior devices and, if desired, can be made to diminish with increasing pump speed.

Another object is to provide such a system which is well adapted for application to conventional pumping structures of the vane type.

It is also an object to provide low cost pumping structure having such a system incorporated therein.

Further objects and advantages of the present invention will be apparent from the following description, reference being had to the accompanying drawing wherein a preferred form of the present invention is clearly shown.

In the drawing:

Figure 1 is a longitudinal cross-sectional view of pumping structure incorporating the present invention, taken on line 1—1 of Figure 2.

Figure 2 is a sectional view taken on line 2—2 of Figure 1.

Figure 3 is a schematic diagram illustrating the present invention.

Figure 4 compares actual performance curves of a pump and flow control valve embodying the present invention and a conventional pump and flow control valve.

Referring now to Figure 1, there is shown pumping structure of the general type described in the patent to Gardiner et al., No. 2,544,988. The pumping structure includes a body member 10, a ring 12, and a head 14. The ring 12 has an elliptically shaped chamber 16 in which a rotor 18 is telescopically disposed. Rotor 18 is supported on and driven by a drive shaft 20 which is rotatably carried on bearings in a mounting pad, not shown. The usual shaft seal 22 is provided to prevent leakage from the body 10 at the point of emergence therefrom of the shaft 20. Rotor 18 has a plurality of radial slots therein, each of which carries a vane 24. The vanes 24 extend from rotor 18 to abut the elliptical track 16 in ring 12. Rotor 18, ring 12, and vanes 24 are axially abutted at one side by a plane face 26 of the body member 10.

The head 14 includes a recess 28 in which is positioned a pressure plate 30. The periphery of pressure plate 30 engages the chamber 28 in a fluid sealing relation therewith to form a pressure chamber 32. Fluid pressure in chamber 32 biases pressure plate 30 rightwardly and urges the plane face 34 of pressure plate 30 into axial abutment with ring 12, rotor 18, and vanes 24. When the rotor 18 is driven by shaft 20, the outer ends of the vanes 24 will follow the cam track 16. The intervane working chamber between each pair of adjacent vanes will undergo alternate expansion and contraction due to outward and inward movement of the vanes, induced by track 16. Because of the multi-throw, elliptical shape of the pumping chamber, each working chamber will expand and contract twice in each revolution. Each intervane working chamber bounded by a vane moving along one of the inlet ramps 36 will be increasing in size, and each of the intervane working chambers bounded by a vane moving along one of the discharge ramps 38 will be decreasing in size. The pumping structure thus far described is similar in nature to that in the Gardiner et al. patent. A more detailed description may be obtained by reference to that patent.

A reservoir 40 is telescoped over head 14 to engage a seal 42 on ring 12. Reservoir 40 is secured to the head 14 by a bolt 44 and is provided with the usual filler cap and dip stick assembly 46. Prior to operation of the unit, reservoir 40 is filled with hydraulic fluid. A boss 48 is provided on the body 10 and has a return connection port 50 therein. A return passage 52 extends through the ring 12 to establish communication between the interior of reservoir 40 and the return connection port 50. Fluid returning from an operated device will pass from connection port 50 through the return passage 52 to the interior of reservoir 40 where it will be cooled and deaerated. The expanding intervane chambers adjacent each of the inlet ramps are supplied with fluid by a pair of inlet ports 54 and 56 connected by a passage 58 extending through ring 12. Only one pair of these ports is illustrated in Figure 1. Ports 54 and 56 communicate through passages 60, 62, and 64 with the interior of reservoir 40. Fresh fluid will be supplied to the inlet zones through passages 64, 62, and 60 and the inlet ports 54 and 56.

The clearance space between the inner end of each vane and its vane slot in the rotor provides an alternately expanding and contracting undervane chamber 61 associated with each vane. Those undervane chambers whose vane is riding over one of the inlet ramps 36 will be increasing in size, and those whose vane is traveling over one of the discharge ramps 38 will be decreasing in size. The undervane chambers communicate with the pressure chamber 32 through a plurality of undervane balancing ports 74, 76, 78, and 80. Undervane balancing ports 74 and 76 communicate with the expanding undervane chambers and ports 78 and 80 communicate with the contracting undervane chambers. Two ports 81, each of which is the mirror image of one of the ports 74 and 76, are machined in the face 26 of body 10. Each of the undervane ports 74, 76, 78, and 80 performs the function of maintaining an outward biasing pressure on the underside of each vane, thus maintaining the tip in contact with the cam ring 16. Ports 74 and 76 each perform an additional function in separate branches of the delivery conduit as will be hereinafter described.

An external delivery connection port 82 is provided in a boss 84 on the body member 10. Port 82 communicates with a drilled passage 86 which extends into body 10. The contracting intervane working chambers discharge high pressure fluid into pressure chamber 32 through discharge port 68 and passages 70 and 72, and directly through discharge ports 66. Pressure chamber 32 communicates with passage 86 and the delivery port 82 through delivery conduit means having three parallel branches. The first of these branches includes mating passages 72 and 70, a supplemental discharge port 68, and a restrictive passage 88 which, through a passage 90, communicates with the passage 86. The other two branches each have interposed in series therein the expanding undervane chambers. As heretofore noted, each of the undervane ports 74 and 76 conducts fluid to the expanding undervane chambers. Each of those ports communicates through those expanding chambers with its mirrored port 81 in body 10. A drilled hole 92 extends from each of the ports 81 to communicate with one of the upwardly extending passages 94 which communicate with the passage 86. Each of the passages 94 has a constriction 96 therein. Further, the ports 74 and 76 each have a restrictive effect which becomes increasingly significant with increasing pump speed.

There is provided in head 14 a valve bore 98 which receives a flow control valve 100. A spring 102 biases valve 100 to the position illustrated wherein the valve nose abuts the pressure plate 30. Valve 100 includes a land 104 which, in the spring biased position illustrated, blocks communication between the pressure chamber 32 and the transverse by-pass and return passage 62. A restrictive drilled passage 106 extends from passage 82 to communicate with a passage 108, which in turn communicates with a passage 110 leading to the spring chamber 112 associated with the valve 100. It will be seen that equal and opposed areas of valve 100 are respectively exposed to pressures in pressure chamber 32 and spring chamber 112. Since the pressure chamber 32 communicates with the passage 86 through the three parallel branches of the delivery passage, the pressure drop across those three branches will be effective on the equal and opposed areas of the flow control valve 100.

Referring now to the schematic diagram of Figure 3, wherein a work load is indicated at 114, the flow path through the pump may be clearly seen. Load 114 may be a steering booster having valving of the restricted open center type. Contracting intervane working chambers discharge fluid into the pressure chamber 32. Fluid discharged into chamber 32 may pass through any one of the three parallel branches of the delivery conduit. The first branch extends directly to the passage 86 and includes the restriction 88. One of the remaining two branches passes through the undervane port 74, the other through the undervane port 76. These ports have been indicated in Figure 3 as restrictions to flow. After passing through ports 74 and 76, flow in these two branches traverses the expanding undervane chambers, the drilled passages 92, and the restrictions 96. Flow in all three branches is reunited in passage 86 and conducted to the work load 114. As heretofore noted, the pressure in chamber 32 is imposed on one end of flow control valve 100, and pressure in the delivery conduit downstream of the three parallel branches imposed on the opposite end of valve 100.

In slow speed pump operation, the entire quantity of fluid pumped will pass from pressure chamber 32 through the three branches of the delivery conduit and to the work load 114. During such low speed operation the spring 102 will maintain the flow control valve 100 in the closed position, wherein the pressure chamber 32 is isolated from the by-pass and return passage 62. As the speed of the pumping mechanism is increased, the discharge rate will also increase. A point will be reached at which the metered flow rate through the branched delivery conduit produces a pressure drop which, reacting across valve spool 100, will overcome spring 102, thus shifting valve 100 to its cracking position, wherein initial communication is established between the pressure chamber 32 and by-pass passage 62. In the conventional system the metered flow rate continues to increase with increasing pump speed. This is due to the rate of the valve biasing spring and the velocity effect of the by-passed fluid on the inner end of the spool. The metered flow curve of such a conventional system is shown by the dotted curve of Figure 4. The continuously increasing metered volume has a most adverse effect on efficiency and cooling in the high speed ranges. Since pressure drop through the load valve increases, so does the pressure drop in the fluid by-passed by the flow control valve. Since the pressure energy of the by-passed fluid is nearly all converted to heat, cooling problems become highly critical, and much power is wasted.

The metered flow rate vs. pump speed curve of a pump and valve combination embodying the present invention is shown by the solid line in Figure 4. The drooping curve is made possible by the addition of the delivery conduit branches which include therein the expanding undervane working chambers. It will be seen that the fluid which is withdrawn from those branches by the expanding undervane chambers will produce a component of the total pressure drop across the restriction of ports 74 and 76. The magnitude of this component of the pressure drop will be dependent solely on pump speed and not on the rate of fluid flow to the work load. The restrictive effect of ports 74 and 76 is very small at low speeds. However, as the pump speed increases, more and more fluid is withdrawn from the branches by the expanding undervane chambers, and the restrictive effect of ports 74 and 76 becomes highly significant. Since the pressure differential imposed on valve 100 is produced by the total pressure drop through the branched delivery conduit between pressure chamber 32 and passage 86, the introduction of a pressure drop in that path having a component which is responsive to the pump speed, and not to metered flow rate, enables by-passing of increased quantities of fluid without increase in metered flow rate. In fact, as can be seen from Figure 4, in the higher speed ranges metered flow actually decreases as pump speed increases. This is due to the increasing significance of the restrictive effect of ports 74 and 76 in the higher speed ranges.

The pressure differential which controls valve 100 is a continuous function of the pressure drop due to flow to the work through the branched delivery conduit and the speed responsive pressure drop due to the flow through ports 74 and 76 for filling the expanding undervane chambers.

Although the embodiment illustrated has proved the most feasible for a wide variety of operating conditions, it should be pointed out that the invention may be successfully practiced if the passage 88 is omitted. Further, the invention is effective both if passage 88 is omitted and if one of the delivery branches through the expanding undervane chambers is omitted.

The present invention has provided a fluid pump and flow control unit for supplying a desired flow rate to a work load at varying pump speeds. The control is responsive to both flow rate to the load and to pump speed. Speed responsiveness has been obtained without undue complication of the pumping structure and without appreciably increasing the cost. In fact, conventional structure may be easily adapted to practice of this invention.

While the form of embodiment of the invention as herein disclosed constitutes a preferred form, it is to be understood that other forms might be adopted, all coming within the scope of the claims which follow.

What is claimed is as follows:

1. A fluid flow control system for delivering a controlled flow rate to a load from pumping mechanism driven at variable speed, comprising: delivery conduit means connecting the pump and the load; valve means to divert fluid from said conduit; first and second flow restrictive means in said conduit; means for withdrawing fluid from said conduit at a rate proportional to pump speed at a point between said first and second restrictive means; and means for utilizing the pressure differential between a point upstream of said first restrictive means and a point downstream of said second restrictive means to control said valve.

2. A fluid flow control system for delivering a controlled flow rate to a load from pumping mechanism driven at variable speed, comprising: delivery conduit means connecting the pump and the load; valve means spring biased to the closed position and shiftable to divert fluid from said conduit; first and second flow restrictive means in said conduit; means for withdrawing fluid from said conduit at a rate proportional to pump speed at a point between said first and second restrictive means; and means for utilizing the pressure differential between a point upstream of said first restrictive means and a point downstream of said second restrictive means to shift said valve against said spring.

3. A fluid flow control system for delivering a controlled flow rate to a load from sliding vane type pumping mechanism driven at variable speed, comprising: alternately expanding and contracting undervane chambers associated with each vane; delivery conduit means connecting the pump and the load; valve means to divert fluid from said conduit; first and second flow restrictive means in said conduit; means including the expanding undervane chambers for withdrawing fluid from said conduit at a rate proportional to pump speed at a point between said first and second restrictive means; and means for utilizing the pressure differential between a point upstream of said first restrictive means and a point downstream of said second restrictive means to control said valve.

4. A fluid flow control system for delivering a controlled flow rate to a load from sliding vane type pumping mechanism driven at variable speed, comprising: alternately expanding and contracting undervane chambers associated with each vane; delivery conduit means, said conduit including in series therein the expanding undervane chambers; valve means to divert fluid from said conduit; first flow restrictive means in said conduit upstream from said expanding chambers; second flow restrictive means in said conduit downstream from said expanding chambers; and means for utilizing the pressure differential between a point upstream of said first restrictive means and a point downstream of said second restrictive means to control said valve.

5. A fluid flow control system for delivering a controlled flow rate to a load from pumping mechanism driven at variable speed, comprising: delivery conduit means having at least two parallel branches and connecting the pump and the load; valve means to divert fluid from said conduit; flow restrictive means in one of said branches; first and second flow restrictive means in the other of said branches; means for withdrawing fluid from said other branch at a rate proportional to pump speed at a point between said first and second restrictive means; and means for utilizing the pressure differential between a point upstream of said first restrictive means and a point downstream of both the other of said restrictive means to control said valve.

6. A fluid flow control system for delivering a controlled flow rate to a load from sliding vane type pumping mechanism driven at variable speed, comprising: alternately expanding and contracting undervane chambers associated with each vane; delivery conduit means having at least two parallel branches and connecting the pump and the load; valve means to divert fluid from said conduit; flow restrictive means in one of said branches; first and second flow restrictive means in the other of said branches; means including the expanding undervane chambers for withdrawing fluid from said other branch at a rate proportional to pump speed at a point between said first and second restrictive means; and means for utilizing the pressure differential between a point upstream of said first restrictive means and a point downstream of both the other of said restrictive means to control said valve.

7. A fluid flow control system for delivering a controlled flow rate to a load from rotary, sliding vane type pumping mechanism driven at variable speed, comprising: a plurality of throws for inducing at least two complete in and out vane movements per revolution; alternately expanding and contracting undervane chambers associated with each vane; branched delivery conduit means, each of said branches including in series therein the expanding undervane chambers associated with the vanes traversing one of the throws; valve means to divert fluid from said conduit; first flow restrictive means in each of said branches upstream from said expanding chambers; second flow restrictive means in each of said branches downstream from said expanding chambers; and means for utilizing the pressure differential between a point upstream of said first restrictive means and a point downstream of said second restrictive means to control said valve.

8. A fluid flow control system for delivering a controlled flow rate to a load from rotary, sliding vane type pumping mechanism driven at variable speed, comprising: a plurality of throws for inducing at least two complete in and out vane movements per revolution; alternaely expanding and contracting undervane chambers associated with each vane; delivery conduit means having at least three parallel branches and connecting the pump and the load; valve means to divert fluid from said conduit; flow restrictive means in one of said branches; first and second flow restrictive means in each of the other of said branches; means including the expanding undervane chambers associated with the vanes traversing one of the throws for withdrawing fluid from each of said other branches at a rate proportional to pump speed at a point between said first and second restrictive means; and means for utilizing the pressure differential between a point upstream of said first restrictive means and a point downstream of both the other of said restrictive means to control said valve.

References Cited in the file of this patent
UNITED STATES PATENTS

| | | |
|---|---|---|
| 1,467,522 | Amsler | Sept. 11, 1923 |
| 2,544,987 | Gardiner | Mar. 13, 1951 |
| 2,603,065 | Sarto | July 15, 1952 |
| 2,674,092 | Gardiner | Apr. 6, 1954 |
| 2,707,375 | Hammond | May 3, 1955 |